United States Patent [19]

Ikudome

[11] Patent Number: 5,845,070
[45] Date of Patent: Dec. 1, 1998

[54] SECURITY SYSTEM FOR INTERNET PROVIDER TRANSACTION

[75] Inventor: Koichiro Ikudome, Arcadia, Calif.

[73] Assignee: Auric Web Systems, Inc., Pasadena, Calif.

[21] Appl. No.: 769,590

[22] Filed: Dec. 18, 1996

[51] Int. Cl.$^6$ ........................................ G06F 11/00
[52] U.S. Cl. .............. 395/187.01; 395/186; 395/187.01; 395/188.01; 395/200.59; 380/25
[58] Field of Search ................... 395/200.16, 200.17, 395/187.01, 186, 188.01, 200.59; 380/25

[56] References Cited

U.S. PATENT DOCUMENTS

| | | | |
|---|---|---|---|
| 4,218,738 | 8/1980 | Matyas et al. | 380/25 |
| 5,694,595 | 12/1997 | Jacobs et al. | 395/187.01 |
| 5,696,898 | 12/1997 | Baker et al. | 395/187.01 |
| 5,699,513 | 12/1997 | Feigen et al. | 395/187.01 |

*Primary Examiner*—Robert W. Beausoliel, Jr.
*Assistant Examiner*—Pierre Eddy Elisca
*Attorney, Agent, or Firm*—Sheldon & Mak

[57] ABSTRACT

This invention provides security controls against exposing Confidential Information that is required to purchase goods and services from Internet Entity 56 offered on a home page site. The Confidential Information is input to a data base 52 which is part of a tracking and authentication module 50. Including in the tracking and authentication module 50 is a certification server 54, and authentication server 53 and the data base 52. A series of look-up tables, 200, 300 and 400 are provided in the data base 52 and the data entries in the tables, including the Confidential Information, is tied to a first data set which typically includes a user's ID/password and a second data set comprising a framed IP address issued for use only during each log-in - log-out session. It can be any form of alpha-numerical designation. The Confidential Information contained in table 400, if misappropriated, could be used to make purchases chargeable to the user. The purchases can be made without the Confidential Information leaving the data base 52 (table 400). The second data set is used to query the module 50 for validation of the user's creditworthiness and transaction completed by the data base sending a message to the issuer of the credit card to charge the user's account or alternatively noticing the Internet Entity to directly bill user. An additional security measure is provided by the system assigning a third data set consisting of the destination address of each and every Internet Entity that the user contacts during a log-in - log-out session which is tracked by being entered into any one of the tables 200, 300 or 400. It provides another level of validation against the first and second data sets.

13 Claims, 4 Drawing Sheets

Fig. 4

TABLES:

ASSIGNED_IP_ADDRESS — 200

| IP_ADDRESS | USER_ID | DESTINATION ADDRESS |
|---|---|---|
|  |  |  |

SESSION_TABLE — 300

| SESSION_ID | USER_ID | LOGIN_TIME | LOGOUT_TIME |
|---|---|---|---|
|  |  |  |  |

USER_TABLE — 400

| USER_ID | PASSWORD | AMOUNT_USED | AMOUNT_LIMIT | CREDIT CARD NO. | CREDIT LIMIT | CREDIT RATING | DRIVER'S LICENSE NO |
|---|---|---|---|---|---|---|---|
|  |  |  |  |  |  |  |  |

SECURITY SYSTEM FOR INTERNET PROVIDER TRANSACTION

BACKGROUND

This invention relates generally to a method of authenticating an Internet user's identity and providing security control for confidential information usable for completing transactions with an Internet Entity and more particularly to the preservation and tracking of the flow of confidential information necessary to complete the transaction during a specific log-in - log-out session on the Internet.

DISCUSSION

The advent of the Internet System has generated a growing number of individuals subscribing to the services of an Internet Service Provider desirous of purchasing goods or other services. Usually a user will access the system by inputting some personal identification and a password. While the ability to simply access the system by dialing up using a PC is a desirable feature, it exposes the user to the risk of having its confidential information misappropriated. Usually, a user as part of the subscription application will disclose to the Internet provider necessary credit card information, credit ratings, driver's license information, credit limits, a social security number and other pertinent information (all hereinafter referred to as "Confidential Information") which could be misappropriated and any resulting unauthorized use cause financial loss to the user.

A number of methods have been proposed to provide security for the kinds of Confidential Information that is typically exchanged between a user and an Internet Entity. For example, such systems bearing the trade names CYBERCASH and NETCASH are currently available. Such known systems suffer from the disadvantage that the user is required to provide the software to encrypt the protected information. It will be understood that any encrypted message requires appropriate decryption software available to the Internet Entity who is a party to the transaction.

Currently, a user can access the Internet by providing an identification number and/or password which forms the basis for entry to the system. Generally, the Transport Control Protocol (TCP) used in Internet communications, in conjunction with Internet Protocol (IP) offers some measure of security because the unauthorized use of the IP address would be readily recognized by the TCP thereby thwarting the unauthorized use. Presently available dial-up services will accept a user's personal identification number (ID) or other identifying password to bridge a proprietary communication line with Internet. Using well known point of presence (POP) the ID is submitted to an authentication server to check whether the ID is in the authentication server protocol database. Authentication will result in the POP issuing a pre-assigned framed user IP address. Thus the user is assigned a framed IP address in accordance with known systems but there is absent any control relating it to the user's Confidential Information. The issuance of the framed IP address is a gating function that identifies the user as a subscriber and any additional data entered into the system merely courses through unprotected. Prior to completing any transaction the Internet Entity will request clearance of user's Confidential Information. This is where the currently known security controls fail to protect the user's Confidential Information against potential misappropriation and unauthorized use.

SUMMARY OF THE INVENTION

The invention provides a method for authenticating a user's Confidential Information and preserving it against unauthorized use when carrying out a transaction on the Internet. The security feature of the invention involves establishing a database to which is input the user's assigned framed IP address which becomes the second data set valid only for a specific log-in - log-out session. As part of this security feature, there is provided a tracking and authentication module comprising a certification server, an authentication server and a database each performing a validation function before authorizing use of the user's Confidential Information stored in the database.

The security process is initiated when the user logs onto the Internet using an ID and a password which represents a first data set. As the user selects an Internet Entity with which it intends to carry out a transaction, such as for example, a purchase transaction to be paid by credit card or the issuance of a billing statement, the first set of data is fed into a computer base controller to control modems and communication protocols (PPP) running on an equipment known as point of presence (POP) subject to a security key. As part of the security feature, the database will have input the necessary Confidential Information of the user as part of the subscription process. The first data set is tied to the Confidential Information. The POP transmits the first data set to the authentication server of the tracking and authentication module requesting validation. The authentication server in turn accesses the data base which includes a series of look-up tables enabling a comparison of the first data set with the Confidential Information. In response to a database check of the user ID, the authentication server authorizes the POP to issue in real time a new framed IP address. To effect a transaction with an Internet Entity the user keys in an appropriate signal which is a "buy" order. The buy order signal initiates the transaction by passing the second data set to the Internet Entity which starts the validation process through the tracking and authentication module.

The authentication server, reading a successful match will communicate with the POP identifying the assigned framed IP address to the user. Concurrently the framed IP address is input to the database updating the look-up tables. The third component of the tracking and authentication module is the certification server which is accessed by the Internet Entity, e.g. an Internet home page site. Based on the second data set, the framed IP address, a transaction between a user and the Internet Entity is screened by the Entity submitting the framed IP address to the certification server. There is provided in the certification server validation data that authenticates the Internet Entity as authorized to offer its services on the Internet. After an initial authentication of the Internet Entity, the user's framed IP address is input to the database for a match with the look-up tables.

The database in response to a user ID inquiry determines the identity of the user that is currently using the framed IP address, tieing the Confidential Information corresponding to the user ID. The data base will record the charges for the transaction and send a billing statement or instruct the certification server to release the Confidential Information to the Internet Entity through data encryption. In special circumstances the data base will authorize the credit card issuer to charge user's account.

BRIEF DESCRIPTION OF THE DRAWINGS

FIG. 4 shows the representative data in the look-up tables in the data base of FIG. 2; and Appendices A-1, A-2 and A-3 of the software listings.

DETAILED DESCRIPTION

Figure 1:
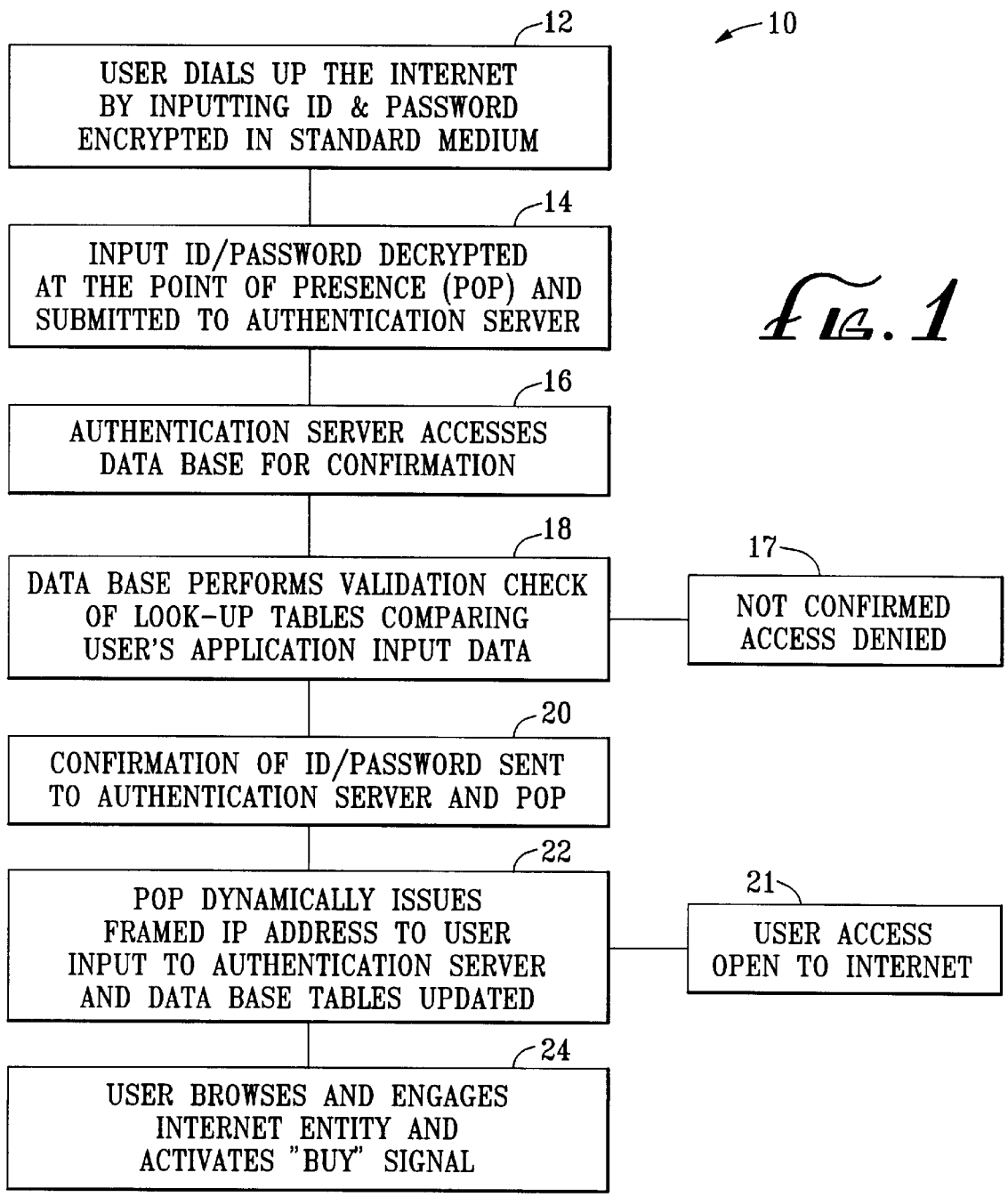
FIGS. 1 and 2 show a flow chart of the method of dynamically authenticating a user and assigning a framed IP address to the user in accordance with the principles of this invention.

Referring to FIGS. 1 through 4, they show the general method of the invention identified with the general reference numeral 10. It provides for authenticating a user to conduct transactions on the Internet during a specific log-in - log-out session and provides appropriate security control of the Confidential Information necessary to complete the transaction. Reference will also be made to the relevant numbered items in the software listing of Appendices A-1, A-2 and A-3.

Typically the user will access the Internet from a personal computer (PC) by inputting his identification and password as a first data set 12. The first data set is sent to an authentication server 14 where it is subjected to a first validation check 16 and submitted to the database tables (FIG. 4), identified generally with the reference numeral corresponding to lines 2 and 3 in Appendix A-3. Confirmation of the initial validation check 18 (FIG. 1) of the first data set will generate a second data set 20 and 22. As will be understood the validation certification and authentication processes are carried out in real time. The dynamically assigned framed IP address to new user is a known function of the POP. It will be appreciated that the second data set can comprise any form of alpha or numeric data and it is intended that it not be limited to an address form.

Figure 3:
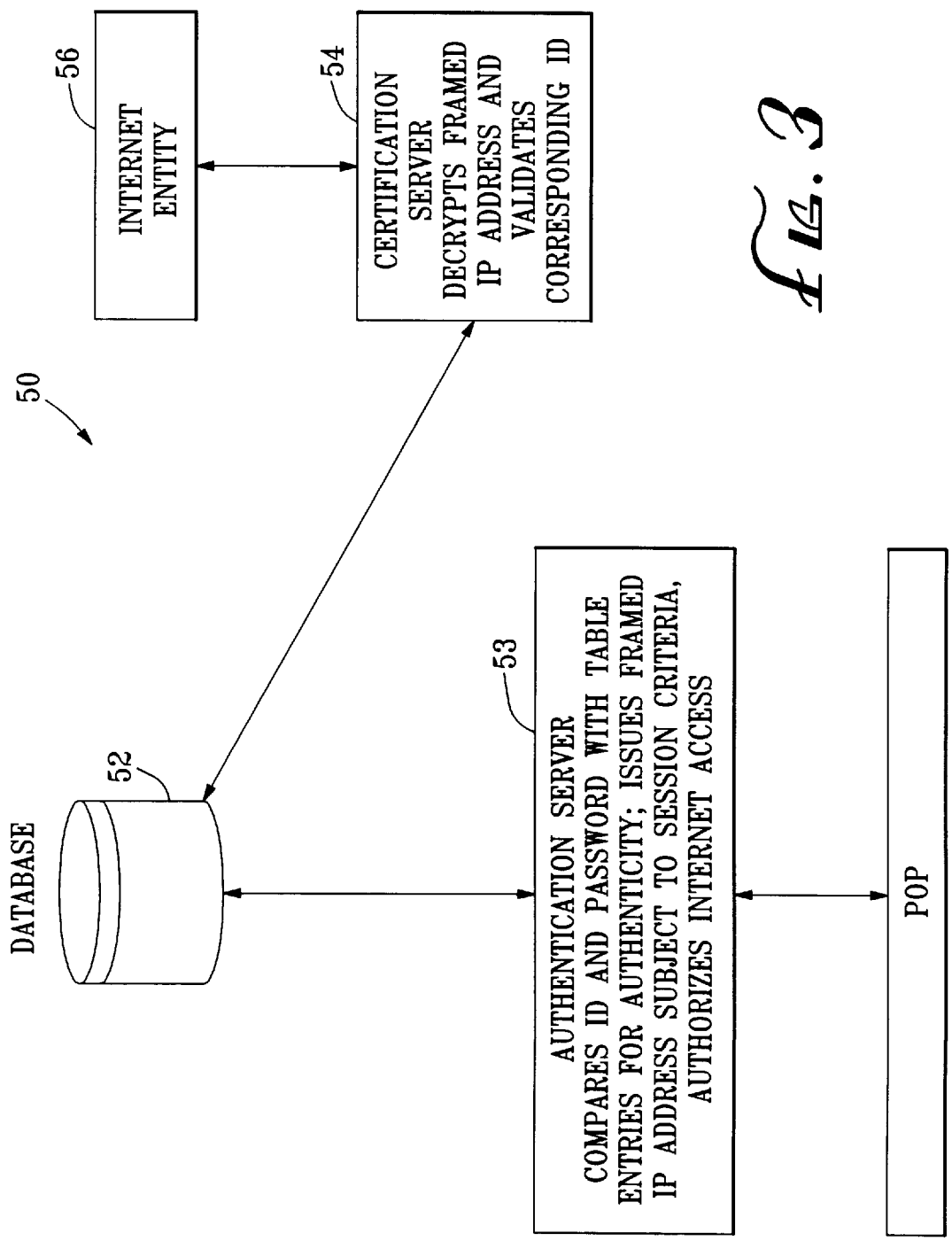
FIG. 3 shows the relationship of the tracking and authentication modules of this invention.

The tracking and authentication module (FIG. 3) of this invention, identified generally with the numeral 50, significantly expands the protection beyond the initial issuance of the new framed IP address. With the validation of the user's ID/password (first data set) and issuance of the second data set (20 and 22) the framed IP address, the POP has initiated the log-in process for the user. Accompanying the log-in message is such information as the time record, ID and framed IP address. These are entered into the tables, 200 and 300, shown in FIG. 4 Software listing: A-1: 37, 41, A-2: 113, 117. The database of FIG. 3 is expanded to contain the previously submitted Confidential Information that corresponds to the user's first data set (ID/password) and second data set (framed IP address). By these data base entries the user's Confidential Information is tied to the first and second data sets.

Included in the data requirements for the database is a destination address. It will be understood that the tracking and authentication module 50 can perform its security control using only the framed IP address. However, when combined with the destination address which is the IP address of the Internet Entity it affords an additional level of security. The user is issued the framed IP address 20 and 22 and can use it for the instant transaction with an Internet Entity to purchase either goods or services.

FIG. 3 illustrates the software that comprises the tracking and authentication module identified generally with the numeral 50. It is effective in controlling the confidentiality of the user's information. Included in the tracking and authentication module 50 is the data base 52, the authentication server 53 and the certification server 54. The Internet Entity 56 is equipped with software that communicates with the certification server 54. The user's Confidential Information is made part of the data base 52 at the time it subscribes to use the Internet. The data base 52 software includes a server of look-up tables which contain the user's Confidential Information as shown in FIG. 4. As a user initiates access to the Internet by inputting its first data set 12 to the point of presence (POP) it is submitted to the authentication server 53 where it is run through a check to match it to the user's ID and password, table 400 referenced in Appendix A-3: 2, 3. The log-in time will be input to the table 300. Upon finding a match the authentication server 53 sends a validation message to the POP referenced in Appendix A-2: 120, 121, issues a second data set, namely a new framed IP address which concurrently updates the data base 52 in accordance with Appendix A-1: 37, 41 with corresponding user ID.

The user thereafter will refer to the framed IP address as he surfs through the various Internet Entities looking for particular goods or services during a log in session. As the user engages Internet Entities using his framed IP address the tracking and authentication module 50 will access the certification server 54 validating the Internet Entity authenticating the user by his framed IP address.

Figure 2:
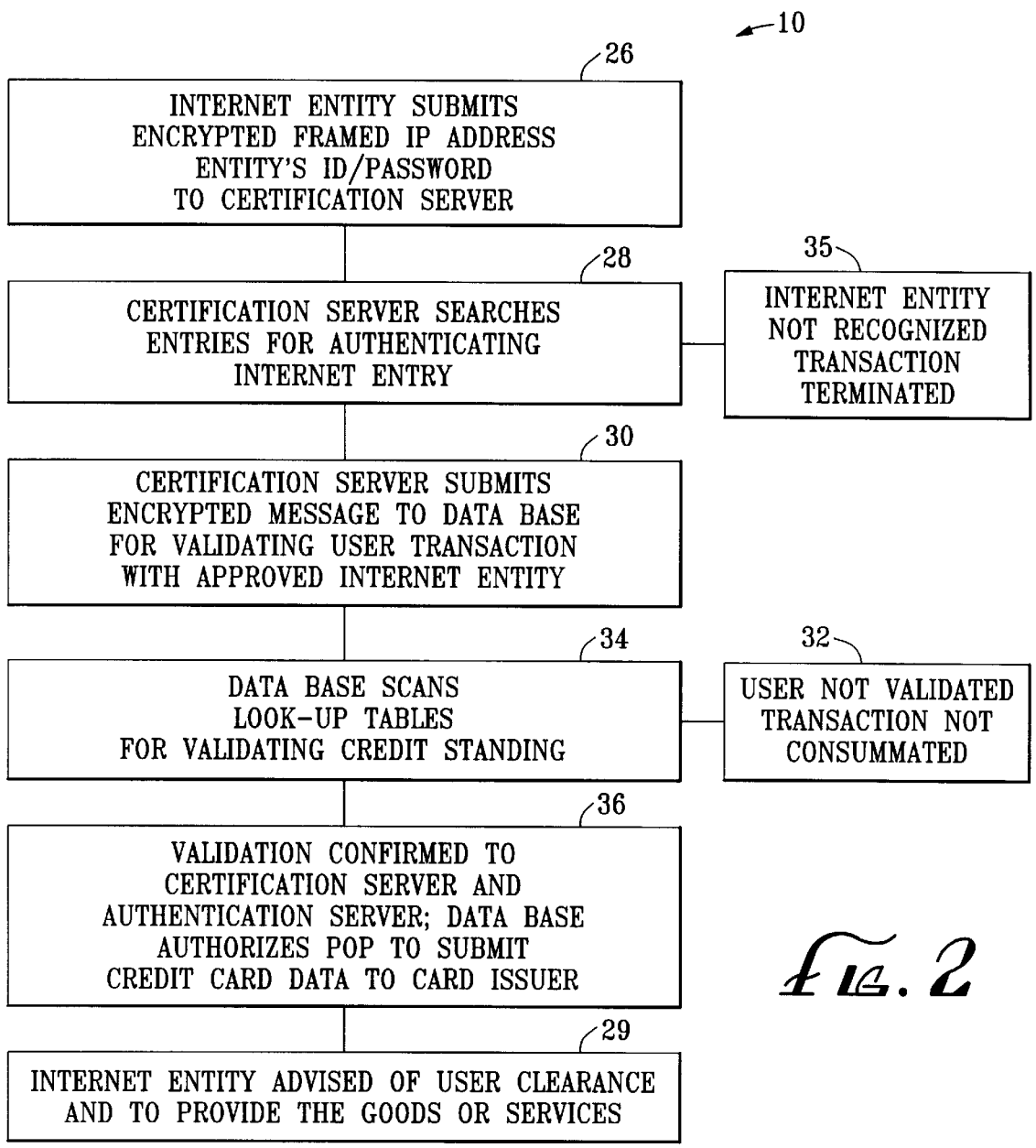

The Internet Entity which is also known as the world wide web server (WWW) is represented by the certification server 54 (FIG. 3) When the user decides to transact business with the Internet Entity it activates an appropriate key which signals a "buy" authorization. This invokes the tracking and authentication module 50 by inputting the second data set to the data base 52 (FIG. 3). The Internet Entity in response to a "buy" order submits the framed IP address to the certification server 54 (FIG. 2) which contains the authorized listing of Internet Entities. The Internet Entity server 56 (FIG. 3) has input the user's encrypted framed IP address which is transmitted to the certification server 54. The certification server 54 in response to a "buy" order requires the Internet Entity 56 to send its request message 26 (FIG. 2) encrypted with a key identifying itself. The certification server 54 validates the authenticity of the Internet Entity 28 (FIG. 2). If validated, the user's first data set coupled with the newly issued framed IP address, the second data set, will identify the user by reading data base table 200, Appendix A-1: 37–41. With the appropriate identification of the user's framed IP address, the certification server 54 (FIG. 3) sends a message 30 (FIG. 2) to the database tables to read the Confidential Information by using the first data set with the database tables Appendix A-3: 2–16, 22–45. Unless the user's Confidential Information appropriately qualifies to meet completing the transaction, the tracking and authentication module 50 will generate an error signal 32 denying the transaction. The protected information in the database 52 (FIG. 3) necessary to complete the transaction is validated 34 (FIG. 2) to the extent that it is tied to the user. It will not be disclosed outside the data base unless special provision is made to release it. The option is available in certain special circumstances to send the Confidential Information to the Internet Entity. Once the user's credit standing is confirmed the transaction is validated to the Internet Entity 26 so it can be completed.

Referring to FIG. 4 there is shown the look-up tables and data base part of the tracking and authentication module. Starting with the session table 300 the session ID is corroborated with the user ID along with the log-in time. The next table 200, Appendix A-1: 36–37, deals with the framed IP address in which user ID exists only for the current log-in session. Access to the additional information, the user table 400 is conditioned based on the entries in table 200, namely the framed IP address and user ID being matched. The user table 400 provides the essential Confidential Information necessary for completing the transaction, namely assuring the Internet Entity 56 receives payment. It will be understood that the table 300 merely creates a retrievable record of the data entries and generally does not participate in the validation process.

The user table 400 contains addressability information of the user, such as one or more unexpired credit card numbers, credit limits, driver's license information, credit rating as a function of the billing amount. If a run through of the information for the current buy order input to the data base is corroborated with the framed IP address, the user ID, the session ID, the password and other financial benchmarks, an instruction is sent to the Internet Entity that the transaction is validated. Once cleared the data base instructs the ISP to submit the charge under the user's credit card directly to the credit card company who pays the Internet Entity.

In practice, after browsing through a particular home page of an Internet Entity the user will execute a "buy" order 24 (FIG. 1) activating an appropriate computer key. Once the "buy" order is executed the Internet Entity 56 (FIG. 3) submits the charge order against the framed IP address to the certification server 54. It is put through a validation check and if it matches the new user ID, the log-in time, the buy order clearance is communicated to the data base 52. The clearance is input to the session table 300, Appendix A-2: 112–123 and Appendix A-1: 17–28.

An alternative form of consummating the transaction provides that the data base 52 instruct the certification server 54 of the clearance accompanied by instructions and information that permits the Internet Entity to send a bill directly to the user.

The tracking and authentication module 50 provides for an alternate security control that monitors and tracks the destination address of the user as he browses the available destination Internet Entities for the kinds of goods or services he may be interested in. The table 200, Appendix A-1: 37–44, in addition to the framed IP address includes the destination address which is monitored by the tracking and authentication module 50. As the user contacts different Internet Entities 56 the POP generates a new destination address which replaces the previous destination address in table 200 forming the referential address. With the additional security control the data base 52 is now programmed to validate a transaction subject the referential address in the date base.

APPENDIX A-1 cr_aws.sql

Copyright 1996

```
1   CREATE TABLE AWS_ACCOUNT (
2      USERID CHAR (10)   NOT NULL,
3      PURCHASE_STATUS CHAR (1)   NOT NULL,
4      USED_AMOUNT NUMBER (10,2)   NOT NULL,
5      CREDIT_LINE NUMBER (10,2)   NOT NULL,
6      LAST_MOD_TMSTMP DATE   NOT NULL
7      )
8      TABLESPACE TOK1_USER_TABLE
9   ;
10
11  CREATE INDEX ZABOW05_ZABOZ05 ON AWS_ACCOUNT (
12     USERID
13     )
14     tablespace TOKI_USER_INDEX
15  ;
16
17  CREATE TABLE AWS_EVENT (
18     USERID CHAR (10)   NOT NULL,
19     MERCHANT_ID NUMBER (38)   NOT NULL,
20     AWS_EVENT_STATUS CHAR (1)   NOT NULL,
21     MERCHANG_ISP_ID CHAR (10)   NOT NULL,
22     MERCH_RQST_CD CHAR (10)   NOT NULL,
23     MERCH_RQST_AMT NUMBER (10,2)   NOT NULL,
24     EVENT_TIMESTAMP DATE   NOT NULL,
25     AWS_EVENT_ID NUMBER (38)   NOT NULL
26     )
27     tablespace TOKI_SESSION_TABLE
28  ;
29
30  CREATE INDEX ZABOB05_ZABQB05 ON AWS_EVENT (
31     AWS_EVENT_ID
32     )
33     tablespace TOKI_SESSION_INDEX
34  ;
35
36  CREATE TABLE AWS_IP_ADDRESS (
37     FRAMED_ADDRESS CHAR (15)   NOT NULL,
38     ISP_IP_ADDRESS CHAR (15)   NOT NULL,
39     ACCT_SESSION_ID CHAR (16)   NULL,
40     NAS_IDENTIFIER CHAR (15)   NULL,
41     USERID CHAR (10)  NULL,
42     LOGIN_DATE DATE  NULL,
43     ISP_ID CHAR (10)  NOT NULL,
44     TARGET_IP_ADDRESS CHAR (15)  NULL
45     )
46     tablespace TOKI_OTHER_TABLES
47  ;
48
49  CREATE INDEX ZABON05_ZABOT05 ON AWS_IP_ADDRESS (
50     FRAMED_ADDRESS
51     )
52     tablespace TOKI_OTHER_INDEXES
53  ;
54
55  CREATE TABLE AWS_MERCHANT (
56     MERCHANT_ID NUMBER (38)  NOT NULL,
57     MERCHANT_NAME CHAR (40)  NOT NULL,
58     MERCHANT_ISP_ID CHAR (10)  NOT NULL,
59     MERCHANT_PASSWORD CHAR (10)  NOT NULL
60     )
61     tablespace TOKI_OTHER_TABLES
62  ;
63
64  CREATE INDEX ZABOG05_ZABOK05 ON AWS_MERCHANT (
```

Appendix A-1 (continued)

```
65      MERCHANT_ID,
66      MERCHANT_ISP_ID
67      )
68      tablespace TOKI_OTHER_INDEXES
69  ;
70
71  /*********************************
72   * Sequences
73   *********************************/
74  create sequence aws_event_id_seq
75          increment by 1
76          start with 100
77          maxvalue 1e+19
78          minvalue1
79          cache 20
80  ;
81
82  /*********************************
83   * Inserting default values
84   *********************************/
85
86  /** AWS_IP_ADDRESS **/
87  insert into AWS_IP_ADDRESS
88      (FRAMED_ADDRESS, ISP_IP_ADDRESS, ISP_ID)
89  values ('206.1.167.200', '206.1.167.24', 'AWS-ISP');
90  insert into AWS_IP_ADDRESS
91      (FRAMED_ADDRESS, ISP_IP_ADDRESS, ISP_ID)
92  values ('206.1.167.201', '206.1.167.24', 'AWS-ISP');
93
94  /** AWS_MERCHANT **/
95  insert into AWS_MERCHANT
96      (MERCHANT_ID, MERCHANT_NAME, MERCHANT_ISP_ID, MERCHANT_PASSWORD)
97  values (1001, 'Sony', 'SNY', 'NOPasswd');
98  insert into AWS_MERCHANT
99      (MERCHANT_ID, MERCHANT_NAME, MERCHANT_ISP_ID, MERCHANT_PASSWORD)
100 values (1002, 'Philips', "PHLPS', 'NOPsswd');
101
102 commit;
103 exit;
```

APPENDIX A-2 db0.sql

Copyright 1996

```
1   /*********************************
2   ** OTHER tables
3   *********************************/
4
5   CREATE TABLE ROUTING (
6           MACHINE_ID      CHAR (2),
7           MACHINE_NAME    CHAR (20)
8           )
9   ;
10
11  CREATE TABLE TOKI_ROUTING (
12          MACHINE_ID      CHAR (2)
13          NUMBER_OF_USERS NUMBER (38),
14          ASSIGN_LOT_FLAG CHAR (1),
15          USER_TYPE       CHAR (1)
16          )
17  ;
18
19  CREATE TABLE TOKI_JADDRESS (
20          ADDRESS_ID      CHAR (10),
21          CUSTOMER_ID     CHAR (10),
22          USERID  CHAR (10),
23          ZIP_CODE        CHAR (20),
24          ADDRESS_LINE1   VARCHAR2 (200),
25          ADDRESS_LINE2   CHAR (50),
26          EMAIL_ADDRESS   CHAR (50),
27          PROVINCE        CHAR (20),
28          CITY    CHAR (20),
29          ADDRESS_TYPE    CHAR (5),
30          CUSTOMER_CONTACT            CHAR (50),
31          SALES_REP       CHAR (50),
32          PHONETICCSTMRCNTCT          CHAR (50),
33          PHONETIC_SALES_REP          CHAR (50),
34          PHONETIC_CITY   CHAR (20),
35          PHONETIC_PROVINCE           CHAR (20),
36          PHONETIC_ADDRSSLN1          VARCHAR2 (200),
37          PHONETIC_ADDRSSLN2          CHAR (50)
38          )
39  ;
40
41  CREATE TABLE TOKI_JCUSTOMER (
42          CUSTOMER_ID     CHAR (10),
43          COMPANY_NAME    CHAR (50),
44          PHONETIC_COMPANYNM          CHAR (50),
45          CREATED_BY      CHAR (10),
46          CREATION_TMSTMP DATE,
47          LAST_MODIFIED_BY            CHAR (10),
48          LAST_MOD_TMSTMP DATE,
49          COUNTRY_CODE    CHAR (3),
50          COMPANY_TYPE    CHAR (5),
51          COMPANY_STATUS  CHAR (3)
52          )
53  ;
54
55  CREATE TABLE TOKI_LOT (
56          LOT_NUMBER      CHAR (3),
57          ORDER_ID        NUMBER (38),
58          NUMBER_OF_USERS NUMBER (38),
59          MACHINE_ID      CHAR (2),
60          LOT_ID  NUMBER (38)
61          )
62  ;
63
64  CREATE TABLE TOKI_ORDER (
```

Appendix A-2 (continued)

```
65          ORDER_ID            NUMBER (38),
66          CUSTOMER_ID         CHAR (10,)
67          ORDER_STATUS        CHAR (1),
68          NUMBER_OF_USERS     NUMBER (38),
69          SECONDS_ALLOTTED                    NUMBER (38),
70          ORDER_ADDED_DATE                    DATE,
71          LAST_MOD_TMSTMP DATE,
72          LAST_MODIFIED_BY                    CHAR (10),
73          CREATED_BY          CHAR (10),
74          CREATION_TMSTMP DATE,
75          INVOICE_ID          CHAR (10),
76          DELIVERY_DATE       DATE,
77          EXPIRATION_DATE     DATE,
78          PRINT_REQUEST_DATE                  DATE,
79          PRINT_RECV_DATE DATE,
80          PRINT_PURCH_ORDER                   CHAR (15),
81          PRINT_INVOICE_ID                    CHAR (15),
82          CUST_PURCH_ORDER                    CHAR (15)
83          )
84  ;
85
86  CREATE TABLE TOKI_PAYMENT (
87          USERID      CHAR (10),
88          PAY_TYPE            CHAR (15),
89          INSTITUTION         CHAR (15),
90          ACCOUNT_NUMBER  CHAR (15),
91          APPR_NUMBER         CHAR (20),
92          EXPIRATION_DATE DATE,
93          PRIORITY            CHAR (5),
94          CARD_HOLDER         CHAR (50),
95          COMMENTS            VARCHAR2 (300)
96          )
97  ;
98
99  CREATE TABLE TOKI_PHONE_FAX (
100         CUSTOMER_ID         CHAR (10),
101         USERID   CHAR (10),
102         PHONE_AREA_CODE CHAR (10),
103         PHONE_NUMBER        CHAR (15),
104         PHONE_EXTENSION CHAR (5),
105         PHONE_PREFIX        CHAR (5),
106         PHONE_TYPE          CHAR (5),
107         FAX_AREA_CODE       CHAR (10),
108         FAX_NUMBER          CHAR (15)
109         )
110 ;
111
112 CREATE TABLE TOKI_SESSION (
113         USERID   CHAR (10)
114         NAS_IDENTIFIER      CHAR (15),
115         NAS_PORT            NUMBER (38),
116         ACCT_SESSION_ID CHAR (16),
117         FRAMED_ADDRESS  CHAR (15),
118         EVENT_STATUS        CHAR (1),
119         ACCT_SESSION_TIME                   NUMBER (38),
120         LOGIN_DATE      DATE,
121         LOGOUT_DATE     DATE
122         )
123         TABLESPACE TOKI_SESSION
124 ;
125
126 CREATE TABLE TOKI_USER (
127         CUSTOMER_ID         CHAR (10),
128         ORDER_ID            NUMBER (38),
129         USERID  CHAR (10),
130         PASSWORD            CHAR (10),
131         SECONDS_USED        NUMBER (38),
132         LOT_NUMBER          CHAR (3),
133         STATUS   CHAR (1),
134         SECONDS_ALLOTTED                    NUMBER (38),
135         SECONDS_REMAINING                   NUMBER (38),
```

Page 2

Appendix A-2 (continued)

```
136         LAST_LOGIN_TMSTMP          DATE,
137         LAST_LOGOUT_TMSTMP         DATE,
138         COUNTRY_CODE     CHAR (3),
139         CREATED_BY       CHAR (10),
140         CREATION_TMSTMP DATE,
141         LAST_MODIFIED_BY           CHAR (10),
142         LAST_MOD_TMSTMP DATE
143         )
144         TABLESPACE TOKI_USER_TABLE
145   ;
146
147   /****
148   ***   INDEX
149   ***/
150
151   CREATE INDEX TOKI_JADDRESS_I1 ON
152         TOKI_JADDRESS (ADDRESS_ID)
153   ;
154
155   CREATE INDEX TOKI_JCUSTOMER_I1 ON
156         TOKI_JCUSTOMER (CUSTOMER_ID)
157
158   CREATE INDEX TOKI_LOT_I1 ON
159         TOKI_LOT (LOT_ID)
160   ;
161
162   CREATE INDEX TOKI_ORDER_I1 ON
163         TOKI_ORDER (ORDER_ID)
164   ;
165
166   CREATE INDEX TOKI_PAYMENT_I1 ON
167         TOKI_PAYMENT (USERID, DBID_TOKI_PAYMENT)
168   ;
169
170   CREATE INDEX TOKI_PHONE_FAX_I1 ON
171         TOKI_PHONE_FAX (PHONE_ID)
172   ;
173
174   CREATE INDEX TOKI_SESSION_I1 ON
175         TOKI_SESSION (ACCT_SESSION_ID, USERID, NAS_IDENTIFIER)
176         TABLESPACE TOKI_USER_INDEX
177   ;
178
179   CREATE INDEX TOKI_USER_I1 ON
180         TOKI_USER (USERID)
181         TABLESPACE TOKI_USER_INDEX
182   ;
183
184   CREATE TABLE TOKI_SECURITY (
185         SYSTEM_GROUP_ID  CHAR (10),
186         PROCESS_ID       CHAR (40)
187         )
188   ;
189
190   CREATE TABLE TOKI_SYSTEM_USER (
191         SYSTEM_USERID    CHAR (10),
192         SYSTEM_GROUP_ID  CHAR (10),
193         PASSWORD         CHAR (10)
194         )
195   ;
196
197   CREATE INDEX TOKI_SECURITY_I1 ON
198         TOKI_SECURITY (SYSTEM_GROUP_ID, PROCESS_ID)
199   ;
200
201   CREATE INDEX TOKI_SYSTEM_USER_I1 ON
202         TOKI_SYSTEM_USER (SYSTEM_USERID)
203   ;
```

APPENDIX A-3 db0.sql

Copyright 1996

```
1   CREATE TABLE TOKI_IND_USER (
2           USERID    CHAR (10),
3           PASSWORD          CHAR (10),
4           BILL_TO   CHAR (10),
5           SERVICE_TYPE      CHAR (15),
6           SECONDS_USED      NUMBER (38),
7           LAST_LOGIN_TMSTMP         DATE,
8           LAST_LOGOUT_TMSTMP        DATE,
9           SECONDS_MAX       NUMBER (38),
10          COUNTRY_CODE      CHAR (3),
11          BELONG_TO         CHAR (10),
12          STATUS    CHAR (1),
13          CREATED_BY        CHAR (10),
14          CREATION_TMSTMP DATE,
15          LAST_MODIFIED_BY          CHAR (10),
16          LAST_MOD_TMSTMP DATE
17          )
18          TABLESPACE TOKI_USER_TABLE
19  ;
20
21  CREATE TABLE TOKI_IND_USER_INFO (
22          USER_PHON_FIRST_NM        CHAR (50),
23          USER_PHON_LAST_NM         CHAR (50),
24          USER_LAST_NM      CHAR (50),
25          USER_FIRST_NM     CHAR (50),
26          USERID    CHAR (10),
27          USER_ENGL_FIRST_NM        CHAR (50),
28          USER_ENGL_LAST_NM         CHAR (50),
29          BIRTHDATE         DATE,
30          OCCUPATION        CHAR (50),
31          EMAIL_ADDRESS1    CHAR (50),
32          EMAIL_ADDRESS2    CHAR (50),
33          EMAIL_ADDRESS3    CHAR (50),
34          EMAIL_PASSWORD1 CHAR (10),
35          EMAIL_PASSWORD2 CHAR (10),
36          EMAIL_PASSWORD3 CHAR (10),
37          GARD_FIRST_NM     CHAR (50),
38          GARD_PHON_FIRST_NM        CHAR (50),
39          GARD_ENGL_FIRST_NM        CHAR (50),
40          GARD_PHON_LAST_NM         CHAR (50),
41          GARD_LAST_NM      CHAR (50),
42          GARD_ENGL_LAST_NM         CHAR (50),
43          SEX       CHAR (1),
44          COMPANY_NAME      CHAR (50),
45          COMMENTS          VARCHAR2 (300)
46          )
47          TABLESPACE TOKI_USER_TABLE
48  ;
49
50  CREATE INDEX TOKI_IND_USER_I1 ON
51          TOKI_IND_USER (USERID)
52          TABLESPACE TOKI_USER_INDEX
53  ;
54
55  /**
56  ** SEQUENCE
57  **/
58
59  CREATE SEQUENCE ADDRESS_ID_SEQ
60          INCREMENT BY 1
61          START WITH 100
62          MAXVALUE 1e+19
63          MINVALUE 1
64          CACHE 30
```

Appendix A-3 (continued)

```
 65  ;
 66  CREATE SEQUENCE CUSTOMER_ID_SEQ
 67          INCREMENT BY 1
 68          START WITH 100
 69          MAXVALUE 1e+19
 70          MINVALUE 1
 71          CACHE 30
 72  ;
 73  CREATE SEQUENCE KANJI_ID_SEQ
 74          INCREMENT BY 1
 75          START WITH 100
 76          MAXVALUE 1e+19
 77          MINVALUE 1
 78          CACHE 30
 79  ;
 80  CREATE SEQUENCE LOT_NUMBER_SEQ
 81          INCREMENT BY 1
 82          START WITH 100
 83          MAXVALUE 1e+27
 84          MINVALUE 1
 85          CACHE 20
 86  ;
 87  CREATE SEQUENCE ORDER_ID_SEQ
 88          INCREMENT BY 1
 89          START WITH 100
 90          MAXVALUE 1e+19
 91          MINVALUE 1
 92          CACHE 30
 93  ;
 94  CREATE SEQUENCE PHONE_ID_SEQ
 95          INCREMENT BY 1
 96          START WITH 100
 97          MAXVALUE 1e+19
 98          MINVALUE 1
 99          CACHE 30
100  ;
101  CREATE SEQUENCE SESSION_ID_SEQ
102          INCREMENT BY 1
103          START WITH 100
104          MAXVALUE 1e+19
105          MINVALUE 1
106          CACHE 30
107  ;
108  CREATE SEQUENCE TOKI_PAYMENT_ID_SEQ
109          INCREMENT BY 1
110          START WITH 100
111          MAXVALUE 1e+19
112          MINVALUE 1
113          CACHE 30
114  ;
115  CREATE SEQUENCE TOKI_SEED_SEQ
116          INCREMENT BY 1
117          START WITH 100
118          MAXVALUE 1e+27
119          MINVALUE 1
120          CACHE 20
```

Although the invention has been described with particular reference to certain preferred embodiments thereof, variations and modifications can be effected with the spirit and scope of the following claims.

What is claimed is:

1. A method of authenticating a user's confidential information and preserving the confidentiality against unauthorized use, said information being essential for conducting Internet transactions between a log-in and log-out session, comprising the steps of:

accessing the Internet by the user entering a first data set into a computer based controller to control modems and communication protocols;

establishing a data base containing confidential information subject to authentication with a user's first data set;

submitting said first data set to a tracking and authentication control module requesting authentication of the user, said tracking and authentication control module including a data base containing user's confidential information, an authentication server for authenticating said first data set and a certification server, said certification server containing validation data for authenticating and internet entity approved for conducting internet transaction;

comparing the user's first data set input to the authentication server incident to accessing the internet with the I.D. and password in the data base and subject to a validating match;

issuing a second data set in real time by the authentication server subject to a validation match of the I.D. and password with the data in the database usable for the instant transaction;

submitting the second data set to the certification server upon the initiation of a transaction by the user;

consummating the transaction subject to validation of the second data set by tying the confidential information in the data base to the user whereby the confidential information is retained undisclosed in the data base.

2. The method as claimed in claim 1 wherein the second data set is a framed-IP-address.

3. The method as claimed in claim 1 wherein the framed -IP- address is confirmed by the data base and the authorization control module certifies the credit standing of the user.

4. The method as claimed in claim 1 wherein the user initiates an Internet transaction by inputting the second data set to the Internet Entity and said Internet Entity queries the certification server to verify the identity of the second data set as a condition of completing the transaction.

5. The method as claimed in claim 1 wherein the data base comprises a series of look-up tables containing the first data set, the second data set and the confidential information.

6. The method as claimed in claim 5 wherein the tables in the data base are updated in real time keeping track of each transaction.

7. A method of controlling a user's confidential information and preserving the confidentiality against unauthorized use, said information being essential for conducting internet transactions between a log-in and log-out session, comprising the steps of:

accessing the internet by the user entering a first data set into a computer based controller to control modems and communication protocols;

establishing a data base containing user's confidential information subject to authentication with a user's first data set;

submitting said first data set to an authentication control module requesting authentication of the user, said authentication control module including a data base containing user's confidential information, and authentication server containing validation data for authenticating an internet entity approved for conducting Internet transactions; comparing the user's first data set incident to accessing the internet with the confidential information in the data base and subject to a validating match said computer based controller for controlling modems and communication protocols issuing a second data set;

monitoring the user's selection of an internet entity by the tracking and authentication module and the authentication server and wherein the POP issues a third data set, said second data set and third data set being issued in real time usable for the internet log-in transaction; and consummating a transaction subject to the authentication of the second and third data sets with the first data set in the data base thereby tying the confidential information to the user whereby the confidential information is retained undisclosed in the data base.

8. The method as claimed in claim 7 wherein the third data set is the destination address of the internet entity browsed or engaged by the user.

9. The method as claimed in claim 7 wherein computer based controller for controlling modems and communication protocols is a point of presence program.

10. The method as claimed in claim 7 wherein the certification server identifies the Internet Entity as authorized to conduct transactions on the Internet.

11. The method as claimed in claim 7 wherein the authentication control module tracks the Internet Entity browsed or engaged by the user during the session updating the data base and issuing a new third data set with each such browsing or engagement contact.

12. The method as claimed in claims 1 and 7 wherein the data base can alternately authorizes the certification module to instruct the Internet Entity to bill any charges directly to the user.

13. A method of controlling the confidentiality of a user's Confidential information against unauthorized use, said information being essential for conducting internet transactions comprising the steps of:

providing a data base for tracking and authenticating information input to a tracking and authentication module, said tracking and authentication module including an authentication server and certification server;

establishing a series of look up tables in said data base that record the i.d. and password of the user, the framed IP address, destination IP address and the user's confidential information, said tables including a user table containing the addressability information of the user;

submitting a first data set into the tracking and authentication module;

performing a validation check of the user's first data set with the confidential information in said user table;

issuing a second data set responsive to a successful validation of the first data set with the information in the series of tables;

inputting in real time the second data set to the look up tables;

consummating a transaction subject to the authentication of the second data set with the information in the user table confirming the user as the owner of the confidential information, whereby the confidential information is maintained undisclosed in a series of look up tables.

\* \* \* \* \*